United States Patent [19]

Finkelstein et al.

[11] 4,189,761

[45] Feb. 19, 1980

[54] NON-AQUEOUS ELECTROLYTIC CAPACITOR ELECTROLYTE

[75] Inventors: Manuel Finkelstein, North Adams; Franz S. Dunkl; Sidney D. Ross, both of Williamstown, all of Mass.

[73] Assignee: Sprague Electric Company, North Adams, Mass.

[21] Appl. No.: 824,147

[22] Filed: Aug. 12, 1977

[51] Int. Cl.$^2$ .............................................. H01G 9/02
[52] U.S. Cl. .................................... 361/433; 252/62.2
[58] Field of Search ....................... 252/62.2; 361/433

[56] References Cited

U.S. PATENT DOCUMENTS

| 2,934,681 | 4/1960 | Ross | 361/433 |
|---|---|---|---|
| 2,934,682 | 4/1960 | Schwarz et al. | 361/433 |
| 2,965,690 | 12/1960 | Peterson et al. | 361/433 |
| 3,003,089 | 10/1961 | Bernard et al. | 361/433 |
| 3,138,746 | 6/1964 | Burger et al. | 361/433 |
| 3,196,111 | 7/1965 | Jackson | 252/62.2 |
| 3,300,693 | 1/1967 | Ross et al. | 361/433 |

*Primary Examiner*—Jack Cooper
*Attorney, Agent, or Firm*—Connolly and Hutz

[57] ABSTRACT

A non-aqueous electrolyte for an electrolytic capacitor contains as solute a salt obtained from an amine and a trialkyl phosphate.

11 Claims, 1 Drawing Figure

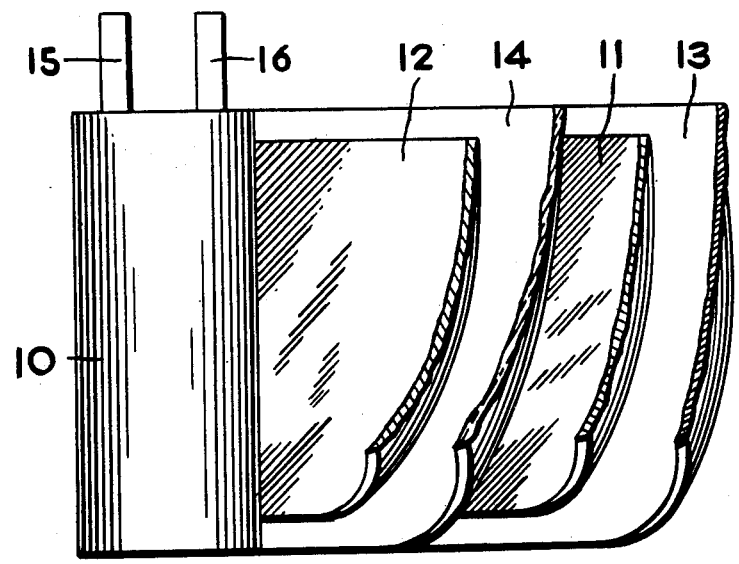

NON-AQUEOUS ELECTROLYTIC CAPACITOR ELECTROLYTE

BACKGROUND OF THE INVENTION

This invention relates to an electrolytic capacitor and more particularly to a non-aqueous electrolyte for an electrolytic capacitor, especially an aluminum electrolytic capacitor.

As is well-known, electrolytic capacitors comprise an anode of a so-called valve metal which has an oxide film on it in contact with an electrolyte. Two of the most commonly used metals are aluminum and tantalum. Aluminum is widely used because of its lower density, lower cost, availability in high-purity form, and relative ease of reformation.

Many electrolytes for aluminum capacitors have unsatisfactory low- and/or high- temperature characteristics. Thus, aqueous electrolytes are restricted generally to operation above the freezing-point and below the boiling-point of the solvent, i.e., water. While ethylene glycol has a lower freezing-point and a higher boiling-point than water, its resistivity at low temperatures is unsatisfactory. N,N-dimethylformamide, another preferred solvent, has a low freezing-point but a boiling-point below that of ethylene glycol.

Beside having a low-freezing and a high-boiling point, an electrolyte solvent should have a high dielectric constant and be chemically neutral to the electrodes and the dielectric oxide. Such solvents include 4-butyrolactone, 3-methoxypropionitrile, propylene carbonate, methyl carbitol, and butyl cellosolve.

Unfortunately, many solutes which have been used in the past with non-aqueous solvents, especially dimethylformamide, are not necessarily useful with other non-aqueous solvents, e.g., 4-butyrolactone.

SUMMARY OF THE INVENTION

It is an object of this invention to provide an electrolyte with improved high- and low- temperature operating characteristics.

It is a further object of this invention to provide solutes suitable for use in non-aqueous solvents, especially 4-butyrolactone.

These objects have been attained through the use as solutes of salts obtained from a trialkylphosphate and an amine. These materials may be prepared by refluxing of a trialkylphosphate and an amine for 12-24 hrs. In the course of this reaction, the trialkylphosphate is converted to a dialkylphosphate anion, and the amine is alkylated to an alkyl-substituted ammonium ion. For example, the reaction of piperidine and triethylphosphate yields N-ethylpiperidinium diethylphosphate which is the product that would result from the neutralization of diethylphosphoric acid with N-ethylpiperidine. The other product that might have been expected, an amide, is the product of ammonolysis of triethylphosphate. However, both 100 MHz proton NMR and phosphorus NMR spectra indicate that the reaction proceeds quite cleanly to give the first product with less than 1% of the amide being formed. The reaction takes place with primary, secondary, and tertiary amines. When tertiary amines are used, the cation formed is a quaternary ammonium ion, and this has been confirmed via picrate derivatives. In all cases, the products were viscous, colored syrups. Conductivities were between 4400 and 6300 Ω cm for the undiluted products.

BRIEF DESCRIPTION OF THE DRAWING

Referring now to the appended drawing, a capacitance section 10 is shown in a partly unrolled condition. Anode 11 is of aluminum or tantalum and has an insulating oxide layer on its surface. Cathode 12 may be also made of aluminum or tantalum and is preferably etched. The anode is also preferably etched. Films 13 and 14 are spacers and may be of paper, polymer film or a combination of these. Tabs 15 and 16 are connected to electrodes 11 and 12 respectively to function as terminals for capacitance section 10.

DESCRIPTION OF THE PREFERRED EMBODIMENTS

In the examples that follow, the solutes are listed in the tables according to starting materials. Thus, N-butylpiperidinium dibutylphosphate is listed as piperidine-tributylphosphate, and N-ethyltributylammonium diethylphosphate is listed as tributylamine-triethylphosphate. The amines used are piperidine, piperazine, morpholine, N-methylmorpholine, ethanolamine, triethylamine, and tributylamine. The phosphates used are trimethylphosphate, triethylphosphate, and tributylphosphate. The salts obtained from the specific products listed in the tables are N-butylpiperidinium dibutylphosphate, N-methylpiperidinium dimethylphosphate, N-ethylpiperidinium diethylphosphate, N-ethyl-2-hydroxyethylammonium diethylphosphate, N-methyl-2-hydroxyethylammonium dimethylphosphate, tetraethylammonium diethylphosphate, N-methyltriethylammonium dimethylphosphate, N-ethyltributylammonium diethylphosphate, N-ethyl,N-methylmorpholinium diethylphosphate, N-ethylmorpholinium diethylphosphate, and N,N'-diethylpiperazinium bis-diethylphosphate. These salts were evaluated in the following solvents: N,N-dimethylformamide (DMF), 4-butyrolactone (BLO), 3-methoxypropionitrile (MPN), acetonitrile (ACN), ethyleneglycol (glycol), propylene carbonate (Pr carbonate), diethyleneglycolmethylether (Me carbitol), ethyleneglycol monobutylether (Bu cellosolve), and mixtures of these.

EXAMPLE 1

Resistivity data at 25° C. in ohm-cm (Ω cm) are presented for various salts in a variety of solvents. The amount of solute in whole-number percent in each solvent is given also in Table I. In most cases, about 1 gm water may be present.

Table I

| Salt formed from reaction of | % | Solvent | Ω cm |
|---|---|---|---|
| Piperidine-tributylphosphate | (40%) | MPN | 664 |
| | (33%) | MPN | 1030 |
| | (25%) | BLO | 1073 |
| | (20%) | glycol | 1008 |
| | (20%) | Pr carbonate | 1030 |
| | (33%) | Me carbitol | 2360 |
| Piperidine-trimethylphosphate | (25%) | BLO | 305 |
| Piperidine-triethylphosphate | (25%) | DMF | 337 |
| | (24%) | MPN | 408 |
| | (25%) | Bu cellosolve | 1115 |
| | (24%) | Me carbitol | 837 |
| | (25%) | glycol | 485 |
| | (25%) | Pr carbonate | 506 |
| Ethanolamine-triethylphosphate | (26%) | DMF | 909 |

Table I-continued

| Salt formed from reaction of | % | Solvent | Ω cm |
|---|---|---|---|
| | (24%) | glycol | 734 |
| | (33%) | Bu cellosolve | 1459 |
| | (25%) | Pr Carbonate | 2231 |
| | (35%) | Me carbitol | 1780 |
| | (24%) | BLO | 1973 |
| | (25%) | MPN | 1287 |
| Ethanolamine-trimethylphosphate | (33%) | glycol | 405 |
| | (10%) | DMF | 855 |
| Triethylamine-triethylphosphate | (50%) | glycol | 493 |
| | (12%) | glycol-MPN(40:60 by wt.) | 270 |
| | (21%) | glycol-MPN(26:74 by wt.) | 184 |
| Triethylamine-trimethylphosphate | (46%) | glycol | 311 |
| | (65%) | glycol | 202 |
| | (25%) | DMF | 146 |
| | (33%) | DMF | 75 |
| tributylamine-triethylphosphate | (20%) | BLO | 743 |
| | (10%) | DMF | 570 |
| N-methylmorpholine-triethylphosphate | | | |
| | (20%) | BLO | 333 |
| morpholine-triethylphosphate | (25%) | DMF | 417 |
| | (33%) | glycol | 686 |
| | (25%) | Me carbitol | 1502 |
| | (25%) | BLO | 686 |
| | (35%) | Bu cellosolve | 2016 |
| | (25%) | Pr carbonate | 807 |
| | (33%) | MPN | 601 |

EXAMPLE 2

Maximum formation voltages ($V_{max}$) at various temperatures are given in Table II for aluminum foil along with resistivity in ohm-cm (Ω cm) at 25° C. for the particular formulation.

Table II

| Formulation | Ω cm | $Vmax_{25}$ | $Vmax_{105}$ | $Vmax_{125}$ |
|---|---|---|---|---|
| 10g Et$_3$PO$_4$-tributylamine 90g DMF 2g H$_3$BO$_3$ 1g H$_2$O | 396 | 293 | — | 495 |
| 10g Et$_3$PO$_4$-piperidine 90g BLO 3g H$_2$O | 477 | 372 | 188 | — |
| 10g Et$_3$PO$_4$-piperazine 90g BLO 3g H$_2$O | 1580 | 295 | — | 267 |
| 10g Et$_3$PO$_4$-morpholine 90g DMF 2g H$_3$BO$_3$ 1g H$_2$O | 438 | 465 | 425 | — |
| 10g Et$_3$PO$_4$-morpholine 90g BLO | 981 | 500 | 492 | 227 |
| 17g Et$_3$PO$_4$-morpholine 78g BLO | 610 | 480 | 383 | 430 |
| 17g Et$_3$PO$_4$-morpholine 68g BLO 1g H$_2$O | 406 | 450 | 445 | — |
| 20g Et$_3$PO$_4$-morpholine 80g BLO 1g H$_2$O | 506 | 450 | 455 | — |
| 40g Me$_3$PO$_4$-piperidine 160g BLO 3% H$_2$O | 324 | 465 | 177 | — |
| 20g Et$_3$PO$_4$-tributylamine 80g BLO 1% H$_2$O | 702 | 228 | 174 | — |
| 35g Me$_3$PO$_4$-ethanolamine 35g glycol 3% H$_2$O | 918 | 155 | 94 | — |

EXAMPLE 3

This example shows the usefulness of this type of electrolyte system for tantalum foil. Methyltriethylammonium dimethylphosphate was prepared by reaction of 70.8 g. of trimethylphosphate and 50.5 g. of triethylamine in 50 ml. of acetonitrile and then removing the acetonitrile. The resistivity was 1020 Ω-cm. A 36% solution of this material is N,N-dimethylformamide had a resistivity of 85 ohm-cm, and the maximum formation voltage for tantalum foil at 25° C. was 145 V.

EXAMPLE 4

A set of 6 aluminum electrolytic capacitors was constructed using the following electrolyte formulation: 20 g N-ethylpiperidinium diethylphosphate (Et$_3$PO$_4$-piperidine), 120 g 4-butyrolactone, and 3 g H$_2$O. The capacitors were of 250 V rating and made with etched and formed aluminum anode foil. Life test data at 200 VDC and 125° C., capacitance in μF, dissipation factor, and leakage current in μA at 0 hr. and 2000 hr. are presented in Table III.

Table III

| Capacitor | 0 hrs. | | | 2000 hrs. | | |
|---|---|---|---|---|---|---|
| | μF | DF | μA | μF | DF | μA |
| 1 | 12.44 | 3.91 | 3.8 | 12.20 | 4.19 | 1.9 |
| 2 | 11.96 | 3.88 | 3.4 | 11.65 | 4.79 | 2.6 |
| 3 | 11.88 | 4.07 | 2.9 | 11.61 | 3.99 | 1.6 |
| 4 | 12.25 | 3.81 | 6.4 | 11.97 | 4.34 | 1.9 |
| 5 | 12.01 | 3.50 | 3.8 | 11.73 | 3.64 | 2.0 |
| 6 | 11.61 | 3.98 | 4.9 | 11.31 | 3.84 | 1.6 |
| Average | 12.02 | 3.86 | 4.2 | 11.74 | 4.13 | 1.9 |

It is seen that capacitance and dissipation factor remained virtually unchanged, or changed only slightly, and leakage current improved. Temperature stability (average of the six units) is presented below.

Table IV

| Temperature | μF | DF | Impedance Ω | Impedance ratio |
|---|---|---|---|---|
| 125° C. | 13.14 | 2.56 | 101 | 0.96 |
| 25° C. | 12.59 | 4.22 | 105 | 1.0 |
| −55° C. | 10.41 | 61.3 | 149 | 1.42 |

These results show a 17% capacitance decrease and a 42% impedance increase at −55° C. which is excellent for aluminum capacitors. These tables show that these capacitors are remarkably stable under operating conditions and over a wide temperature range.

What is claimed is:

1. An electrolyte for an electrolytic capacitor comprising a non-aqueous electrolytic capacitor solvent and as solute an alkyl substituted-ammonium dialkylphosphate salt selected from the group consisting of those obtained from the reaction of a trialkylphosphate and a cyclic amine or an aliphatic tertiary amine, said reaction effecting the conversion of said trialkylphosphate to a dialkylphosphate ion and the alkylation of said amine to an alkyl-substituted ammonium ion.

2. An electrolyte according to claim 1 wherein said trialkylphosphate is trimethylphosphate, triethylphosphate, or tributyl phosphate.

3. An electrolyte according to claim 1 wherein said amine is morpholine, N-methylmorpholine, piperidine, piperazine, triethylamine, or tributylamine.

4. An electrolyte according to claim 1 wherein said nonaqueous solvent is 4-butyrolactone, 3-methyoxypropionitrile, propylene carbonate, N,N-dimethylformamide, ethyleneglycol, diethyleneglycolmonomethylether, ethyleneglycol monobutylether, acetonitrile, or mixtures thereof.

5. An electrolyte according to claim 1 wherein said salt is N-butylpiperidinium dibutylphosphate, N-ethylpiperidinium diethylphosphate, N-methylpiperidinium dimethylphosphate, N-ethylmorpholinium diethylphosphate, N,N'-diethylpiperazinium bis-diethylphosphate, N-ethyl,N-methylmorpholinium diethylphosphate, N-ethyltributylammonium diethylphosphate, N-methyltriethylammonium dimethylphosphate, or tetraethylammonium diethylphosphate.

6. An electrolyte according to claim 1 wherein said salt is N-ethyltributylammonium diethylphosphate and said solvent is N,N-dimethylformamide or 4-butyrolactone.

7. An electrolyte according to claim 1 wherein said salt is N-ethylpiperidinium diethylphosphate and said solvent is 4-butyrolactone.

8. An electrolyte according to claim 1 wherein said salt is N-ethylmorpholinium diethylphosphate and said solvent is 4-butyrolactone.

9. An electrolyte according to claim 1 wherein said salt is N-methylpiperidinium dimethylphosphate and said solvent is 4-butyrolactone.

10. An electrolyte according to claim 1 wherein said salt is methyltriethylammonium dimethylphosphate and said solvent is N,N-dimethylformamide.

11. An electrolytic capacitor including a formed anode electrode, a cathode electrode, and a liquid electrolyte in contact therewith comprising a nonaqueous electrolytic capacitor solvent and dissolved therein as solute an alkyl substituted-ammonium dialkylphosphate selected from the group consisting of those obtained from the reaction of a trialkylphosphate and a cyclic amine or an aliphatic tertiary amine, said reaction effecting the conversion of said trialkylphosphate to a dialkylphosphate ion and the alkylation of said amine to an alkyl-substituted ammonium ion.

* * * * *